United States Patent [19]
Joy et al.

[11] 3,797,309
[45] Mar. 19, 1974

[54] METHOD AND APPARATUS FOR SENSING THE RELATIVE DIRECTION AND VELOCITY OF MOVEMENT OF A BODY IN A LIQUID OR GAS MEDIUM

[75] Inventors: Robert D. Joy; Russell F. Cotton, both of Cedar Rapids, Iowa

[73] Assignee: J-TEC Associates, Incorporated, Cedar Rapids, Iowa

[22] Filed: July 31, 1972

[21] Appl. No.: 276,364

[52] U.S. Cl. .............................................. 73/194 B
[51] Int. Cl. ........................... G01f 1/00, G01p 5/00
[58] Field of Search .................. 73/188, 189, 194 B

[56] References Cited
UNITED STATES PATENTS

| | | | |
|---|---|---|---|
| 3,645,132 | 2/1972 | Rasmussen | 73/189 |
| 2,813,424 | 1/1957 | Liepmann | 73/194 |
| 2,981,104 | 4/1961 | Auger et al. | 73/189 |
| 2,701,474 | 2/1955 | Goudy | 73/189 |
| 3,352,154 | 11/1967 | Djorup | 73/189 |

OTHER PUBLICATIONS

Flow Corporation Bulletin 53 Received in Office May 3, 1966, pgs. 1–4.

Primary Examiner—Herbert Goldstein
Attorney, Agent, or Firm—Griffin, Branigan and Butler

[57] ABSTRACT

A method of and an apparatus for determining the relative direction and velocity of movement between an object and a fluid stream (either gas or liquid) using the Karman vortex phenomena is disclosed. In one form, two omnidirectional ring-shaped struts, at least one of which has a varying thickness, are each mounted between a pair of sonic transducers. One of each pair of sonic transducers is a transmitting transducer, and the other is a receiving transducer. The transmitting transducers transmit sonic signals toward the Karman vortices formed in the wake of their related omnidirectional struts. The vortices modulate the transmitted signal and the modulated signal is received by the receiving transducers. The two thusly received modulated signals are compared in a manner such that the relative direction and the velocity of movement between the strut and the fluid stream is determined. In a second form, two tubes are mounted in orthogonal directions relative to one another. A vortex sensing arrangement is located in either end of each tube to sense the rate of fluid flow entering the ends of the tubes. The thusly measured rates of fluid flow are combined to determine the relative direction and velocity of movement between the tubes and the fluid stream in which the tubes are located.

32 Claims, 13 Drawing Figures

PATENTED MAR 19 1974
3,797,309
SHEET 1 OF 3
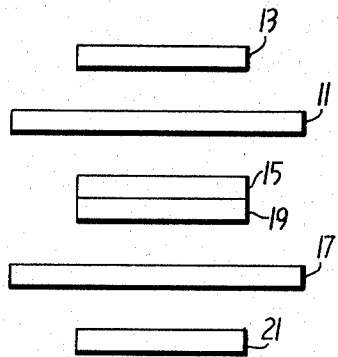
FIG.1
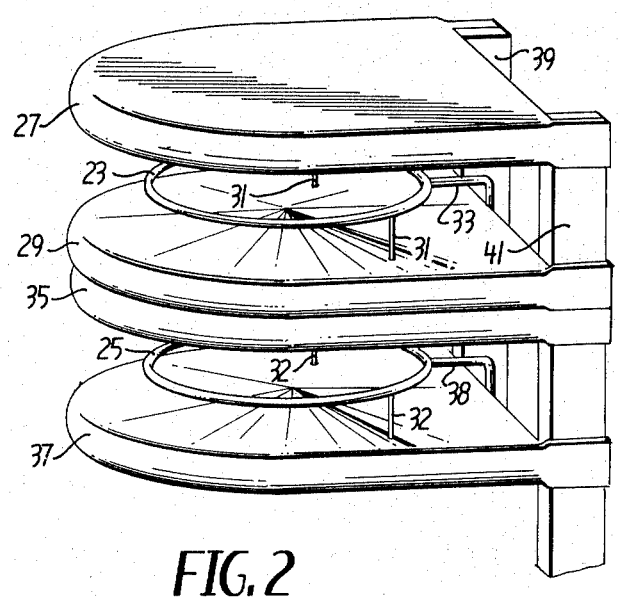
FIG.2
FIG.3A
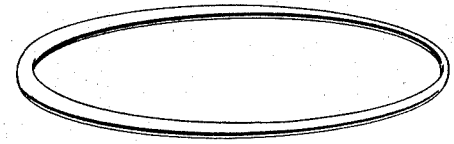
FIG.3B
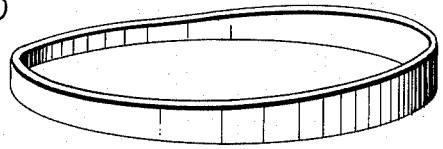
FIG.3C
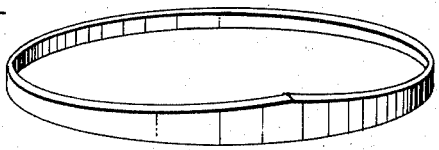
FIG.3D
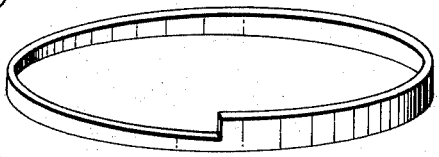
FIG.4A
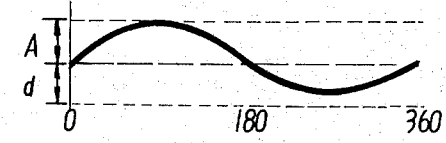
FIG.4B
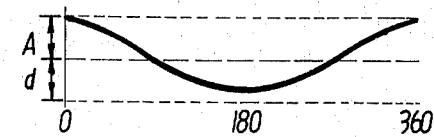

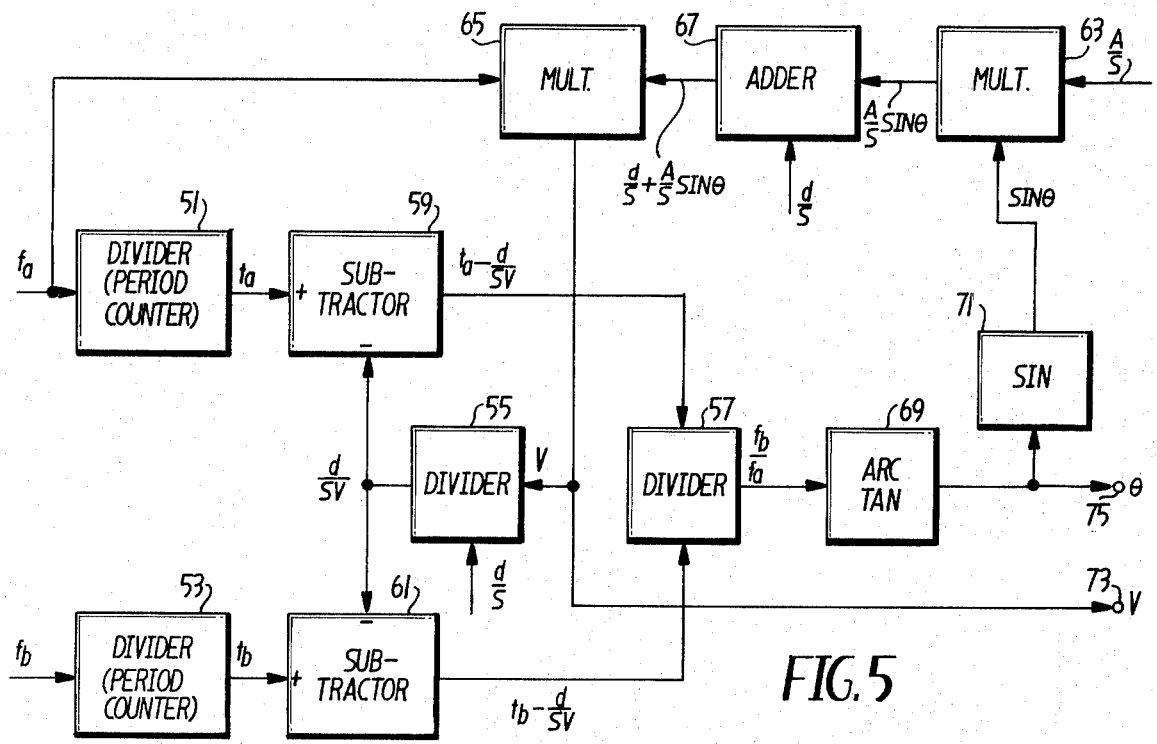
FIG.5
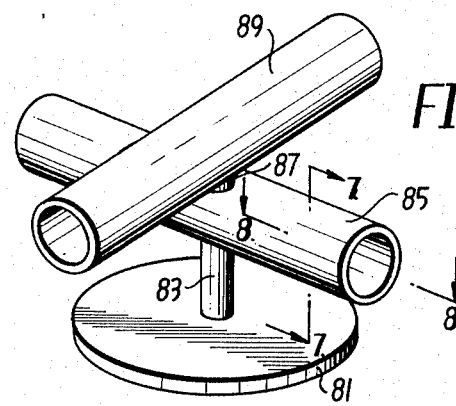
FIG.6
FIG.7
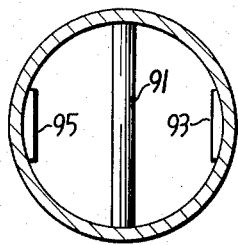
FIG.8
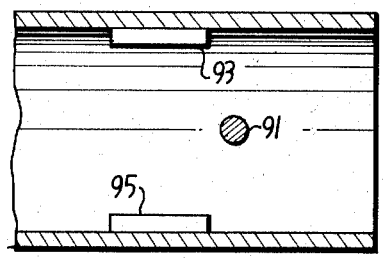

METHOD AND APPARATUS FOR SENSING THE RELATIVE DIRECTION AND VELOCITY OF MOVEMENT OF A BODY IN A LIQUID OR GAS MEDIUM

BACKGROUND OF THE INVENTION

This invention is directed to sonic velocity sensing and more particularly to a method of and an apparatus for measuring the direction of movement of a body with respect to a fluid stream or vice versa, as well as the relative velocity between the body and the fluid stream.

The Karman vortex phenomena is well known. In accordance with this phenomena a fluctuating flow field, more commonly referred to as a Karman vortex street or trail, is formed in the wake of a strut mounted in a fluid stream. The fluid stream may be either gaseous or liquid. The fluctuating flow field is formed of a plurality of vortices. The rate of vortex generation, if appropriately sensed, provides an indication of the relative velocity between the body to which the strut is attached and the movement of the fluid stream.

Various attempts have been made to measure the thusly created vortices to provide velocity information. One such proposal is set forth in U.S. Pat. application Ser. No. 857,328, filed Sept. 12, 1969, now U.S. Pat. No. 3,680,375 and entitled "Sonic Velocity Sensing." While devices of the type described in the foregoing patent application have been highly successful in measuring relative velocity, they lack the ability to measure the relative direction of movement between the strut and the field stream. That is, they cannot measure the direction of movement of the fluid past the strut, if the strut is stationary and the fluid is moving or the direction of movement of the strut through the fluid stream if the fluid stream is stationary and the strut is moving, or, still further, a combination of both.

It will be appreciated that it is not only desirable to provide a method of and apparatus for measuring both relative direction and relative velocity utilizing the Karman vortex phenomena, but that it is particularly desirable to use a "sonic" method of and apparatus for achieving these results because of the accuracy displayed by sonic methods and apparatus. In this regard reference is made to the above noted patent application (Ser. No. 857,328) for a description of the advantages of sonic methods and apparatus as opposed to other methods and apparatus for detecting Karman vortices.

Hence, it is an object of this invention to provide a method of and an apparatus for measuring the direction of movement of a body in a fluid stream or vice versa utilizing the Karman vortex phenomena.

It is anothter object of this invention to provide a method of and an apparatus for measuring the direction of movement of a body in a fluid stream or vice versa and simultaneously measuring the relative velocity of the body with respect to the fluid stream.

It is a further object of this invention to provide a method of and an apparatus for measuring the relative direction of movement between a body and a fluid stream and the relative velocity between the body and the fluid stream utilizing the Karman vortex phenomena.

It is a still further object of this invention to provide a sonic velocity sensing method and apparatus for determining the relative direction and velocity of movement between an object and a fluid stream.

SUMMARY OF THE INVENTION

In accordance with principles of this invention a method of and an apparatus for determining both the relative direction and velocity of a body with respect to a fluid stream is provided. Either the body, the fluid stream, or both may be moving. In addition, the fluid stream may be gaseous or liquid. In general, the method comprises the steps of mounting at least two vortex frequency sensing arrangements in the fluid stream; and, combining the thusly sensed vortex frequencies to determine the direction and velocity of the fluid stream with respect to the vortex frequency sensing arrangements.

In accordance with further principles of this invention, each sonic velocity sensing arrangement comprises a ring-shaped vortex strut mounted between a pair of transducers — one transducer being a sonic signal receiving transducer and the other being a sonic signal transmitting transducer. The vortices generated in the wake of the vortex ring (generally in the center of the rings) modulate the transmitted sonic signal. The modulated transmitted signals are received by the receiving transducers. The modulating signals received by the receiving transducers of the two arrangements are combined so as to determine the velocity of the fluid stream with respect to the sensors, and the direction of movement thereof.

In accordance with alternate principles of this invention, two orthogonal tubes are mounted above one another. Each orthogonal tube includes a vortex strut in either end. Located inward from each vortex strut is a sonic velocity transmitting transducer and a sonic velocity receiving transducer. Each transmitting transducer generates a signal that is modulated by the vortices formed in the wake of the strut, if they exist. The thusly modulated signals are received by their related receiving transducers. The outputs from the receiving transducers are combined so as to determine the relative velocity and direction of movement of the fluid stream with respect to the tubes.

It will be appreciated from the foregoing brief summary that the invention provides a sonic velocity method of and apparatus for determining the relative direction and velocity of movement of a fluid stream with respect to a body either stationary or moving in the fluid stream. That is, the invention provides a method of and an apparatus for determining the direction and velocity of a fluid stream with respect to a body by sensing the creation of vortices formed in the wake of struts by relative movement. The information about the vortices is utilized to determine the required direction and velocity information. Since the invention utilizes a sonic vortex sensing approach, it does not require mechanically movable parts. Rather, the apparatus of the invention utilizes sonic phenomena and electronic components. Thus, the invention is more reliable than prior art devices that utilize mechanically movable elements to determine the relative direction and velocity of movement of a body with respect to a fluid stream.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a schematic diagram illustrating one apparatus formed in accordance with the invention;

FIG. 2 is a perspective diagram of an apparatus of the type schematically illustrated in FIG. 1;

FIGS. 3A-3D are perspective views of various embodiments of a ring-shaped vortex strut suitable for use in the embodiment of the invention illustrated in FIG. 2;

FIGS. 4A and 4B are waveform diagrams illustrating "stretched out" sine wave vortex rings;

FIg. 5 is a block diagram illustrating an electronic system suitable for combining two electronic signals of the type produced by a structure of the type illustrated in FIG. 2 so as to obtain velocity and direction information;

FIG. 6 is a perspective diagram of an alternate embodiment of the invention;

FIG. 7 is a cross-sectional diagram along line 7—7 of FIG. 6;

FIG. 8 is a cross-sectional diagram along line 8—8 of FIG. 6; and,

DESCRIPTION OF THE PREFERRED EMBODIMENTS

Figure 9:
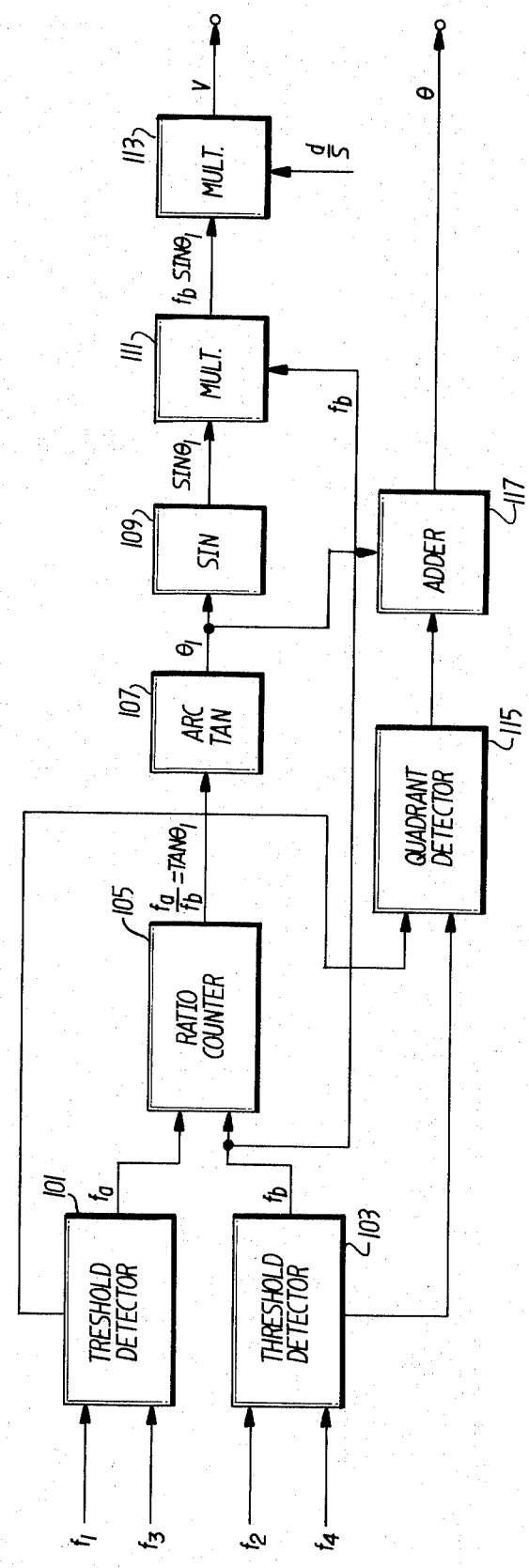
FIG. 9 is a block diagram illustrating an electronic system suitable for combining electronic signals of the type produced by a structure of the type illustrated in FIG. 6 so as to obtain velocity and direction information.

Prior to describing specific embodiments of the invention, a general discussion of Karman vortex phenomena is first presented.

It is well known that a fluctuating flow field composed of vortices is present in the wake of an object located in a relatively moving fluid. That is, if an object is passing through a fluid or if a fluid is passing an object, or still further if both the object and the fluid are moving, a fluctuating flow field is developed in the wake of the object. The fluctuating flow field is composed of vortices which are alternately shed from the sides of the object. This fluctuating flow field is more commonly referred to as a Karman vortex street or trial. Studies of the nature of these fluctuations have been previously conducted and show that a number, known as the Strouhal number, accurately relates the various parameters in dimensionless form. This relationship is:

$$S = fd/V \qquad (1)$$

where:

$S$ is the Strouhal number;

$f$ is the vortex shed frequency in cycles per second;

$d$ is the object width or diameter in feet; and, $V$ is the relative velocity between the body and the fluid stream in feet per second.

One method of detecting the vortex shed frequency utilizes sonic waves. In one form, a transmitting transducer is located on one side of the wake of the strut and transmits a sonic signal toward the vortices formed in the wake. The vortices modulate the transmitted signal and the modulated signal is detected by a receiving transducer located, for example, on the other side of the wake. The frequency of modulation is related to the relative velocity between the strut and the fluid stream in which it is located by equation (1) above. A more detailed description of this method of detecting the vortex shed frequency is set forth in U.S. Pat. application Ser. No. 857,328, referenced above.

While the detection of the vortex shed frequency utilizing sonic and other means has been used in the past to determine the relative velocity between a body and a fluid stream or medium in which the body is located, such phenomena has not been utilized to determine the relative direction of movement between the fluid stream and the body. FIG. 1 is a schematic diagram of a structure formed in accordance with the invention for determining relative direction as well as relative velocity information that utilizes vortex shed frequency phenomena.

FIG. 1 illustrates a first ring-shaped vortex strut 11 mounted between a first transmitting transducer 13 and a first receiving transducer 15. Located beneath this first transducer-vortex strut arrangement is a second transducer-vortex strut arrangment comprising a second ring-shaped vortex strut 17 located between a second transmitting transducer 19 and a second receiving transducer 21.

Since each of the struts is ring-shaped, it is omnidirectional in the general plane defined by the ring. When a relative velocity fluid stream impinges on either strut from any direction in this plane, vortices are created which flow toward the center of the struts. The transmitting transducers 13 and 19 transmit sonic signal which pass through the centers of the ring-shaped struts. Thus, these vortices modulate the transmitted sonic signals. The thusly modulated sonic signals are detected by the associated sonic signal receiving transducer 15 or 21.

A single structure of the foregoing nature is illustrated and described in U.S. Pat. application Ser. No. 857,328 as an omnidirectional embodiment of the invention claimed in that patent application. This invention modifies the foregoing structure in the manner hereinafter described.

The vortex strut 11 of the first transducer-vortex strut arrangement illustrated in FIG. 1 in one form has a constant cross-sectional diameter. Thus, the frequency detected by this unit is only related to the relative velocity between the strut and the fluid medium in which it is located. On the other hand, the vortex strut 17 of the second transducer-vortex strut arrangement has a varying cross-sectional diameter. That is, beginning at a particular point, chosen as 0°, a predetermined diameter or thickness progressively increases (or decreases) as the angle from 0° increases. It will be appreciated from the formula set forth above that the vortex frequency created by this structure is now a function of both speed and direction.

More specifically, as discussed above the output of the first transducer-vortex strut arrangement is:

$$f_a = SV/d_a \qquad (2)$$

where:

$f_a$ is the detected frequency;

$d_a$ is the diameter or thickness of the first vortex strut; and $S$ and $V$ are as described above.

The output of the second transducer-vortex strut arrangement (assuming the strut is merely tapered with a constant rate of diameter or thickness change) is:

$$f_b = \frac{SV}{d_1 + \left(\frac{d_2 - d_1}{360}\right)\theta} \quad (3)$$

where:

$f_b$ is the detected frequency;

$d_1$ is the minimum diameter or thickness of the second vortex strut;

$d_2$ is the maximum diameter or thickness of the second vortex strut;

$\theta$ is the relative direction of movement between the body and the fluid medium; and, $S$ and $V$ are as indicated above.

The foregoing equations can be combined so that:

$$\theta = 360 \, [f_a \, d_a/f_b \, (d_2 - d_1) - (d_1/d_2 - d_1)] \quad (4)$$

Thus, $\theta$ is determined. In addition, the relative velocity is directly determined from equation (2) above.

While the above described method and apparatus for obtaining relative velocity and direction information is satisfactory under some circumstances, certain disadvantages remain. For example, a tapered strut, as shown in FIG. 3D has a discontinuous point. The discontinuity creates errors in the result about the area of discontinuity. Alternatively, the strut may be tapered in a uniform manner so that one side is a "mirror" image of the other side, as illustrated in FIG. 3A. Still further the strut may be tapered in a curved manner so as to resemble a crown, as illustrated in FIG. 3C. In the latter cases, information about which "side" of the strut is creating the vortices must be learned in order for the resultant direction information to have meaning. While this information is readily available, it is undesirable to complicate the invention to obtain it. Hence, it is preferable to use strut shapes that provide this information directly.

While there are a wide variety of strut shapes and arrangements that can be utilized by the invention, the preferred one is uncomplicated because it merely utilizes two identical struts displaced 90°. The struts are, as illustrated in FIG. 3B, shaped to follow a sine wave (displaced by 90°). Thus, at any azimuth angle $\theta$, the vortex generator width is:

$$d_a = d + A \sin \theta \quad (5)$$

$$d_b = d + A \cos \theta \quad (6)$$

where:

$A$ is the thickness between the center point of the sine wave and the maximum (or minimum) point (See FIGS. 4A and 4B);

$d$ is the thickness between the flat bottom of the strut and the center point of the sine wave;

$d_a$ is the thickness of one of the struts at the vortex generating point; and, $d_b$ is the thickness of the other strut at the vortex generating point.

Using the foregoing information allows the two measured vortex frequencies to be represented by the following equations:

$$f_a = S \, V/d + A \sin \theta \quad (7)$$

$$f_b = S \, V/d + A \cos \theta \quad (8)$$

These equations can be processed to determine $\theta$ as follows:

$$t_a = 1/f_a = d/SV + A \sin \theta/SV \quad (9)$$

$$t_b = 1/f_b = d/SV + A \cos \theta/SV \quad (10)$$

$$1/f_a' = t_a - d/SV = A \sin \theta/SV \quad (11)$$

$$1/f_b' = t_b - d/SV = A \cos \theta/SV \quad (12)$$

$$f_b'/f_a' = \sin \theta/\cos \theta = \tan \theta \quad (13)$$

$$\theta = \tan^{-1} f_b'/f_a' \quad (14)$$

Obviously, the velocity can be determined by the use of either equation (7) or equation (8).

It will be appreciated from the foregoing description that the method of the invention discussed above generally comprises the steps of: (1) mounting a first omnidirectional vortex strut between a first sonic transmitter-receiver transducer arrangement so as to detect a first signal having a first frequency related to at least the relative velocity of movement between the first vortex strut and the fluid stream in which it is located; (2) mounting a second omnidirectional vortex strut between a second sonic transmitter-receiver arrangement so as to detect a second signal having a second frequency related to both the relative velocity and relative direction of movement between the second vortex strut and the fluid stream in which it is located; and, (3) combining said first and second signals so as to obtain information about the relative direction as well as the relative velocity between said struts and said fluid stream. Preferably, the frequency of the signal detected by the first sonic transmitter-receiver transducer arrangement is related to the relative direction as well as the relative velocity between the struts and the fluid stream. However, as illustrated by equations (2), (3) and (4) above this information is not absolutely necessary, even though preferred as illustrated by equations (7) through (14).

It will be appreciated that the structure illustrated in FIG. 1 requires that the ring-shaped struts be maintained in space without any mechanical support. This, of course, is impossible. FIG. 2 illustrates one structure for supporting the struts which, while not perfect, reduces the discontinuity problems created by a more complex support structure. Basically, FIG. 2 illustrates upper and lower ring-shaped struts 23 and 25, formed in the manner described above. The upper strut 23 has a sonic transmitting transducer 27 located above it and a sonic receiving transducer 29 located below it (or vice versa). The upper strut 23 is supported by relatively small legs 31 extending upwardly from the upper surface of the sonic receiving transducers 29 and located toward the "rear" of the overall structure. More specifically, while not shown in FIG. 2, the sonic receiving transducer's sonic receiving point is generally located below the center of the strut. The legs 31 are located around the periphery of the sonic receiving point.

In addition to the "rearwardly" mounted legs 31, a rear support 33 is attached to the upper ring-shaped strut 23. The rear support 33 is generally L-shaped and projects rearwardly and then downwardly from the strut, and attaches to the rear of the sonic receiving transducer's housing.

Similarly, the lower ring-shaped strut 25 has a sonic transmitting transducer 35 located above it and a sonic receiving transducer 37 located below it (or vice versa). As with the upper strut 23, the lower strut 25 is supported by relatively small legs 32 extending upwardly from the upper surface of the sonic receiving transducer 37. In addition, a rear support 38 projects rearwardly from the lower ring-shaped strut 25 and downwardly to the sonic receiving transducer 37. The upper sonic receiving and transmitting transducers 27 and 29 and the lower sonic receiving and transmitting transducers 35 and 37 are supported by a pair of rear, vertically arrayed, legs 39 and 41. The legs are attached to the transducers in a manner such that the transducers are fixedly arrayed in the manner described above. While illustrated vertically, the overall structure illustrated in FIG. 2 can, obviously, be arrayed at an angle to the vertical, or horizontal, for that matter.

As previously indicated, the structure used to support the transducers, by its very nature, provides some discontinuity depending upon the relative dire tion of movement between the struts and the fluid stream in which they are located. However, the structure illustrated in FIG. 2 provides generally satisfactory results from most directions. On the other hand, other structures can be provided wherein the struts are located a greater distance from the supports. Alternatively, a plurality of fine supports connected between the struts and the sonic transmitting and receiving transducers can be utilized to support the struts. Thusly constructed supports will form a "cage" between the struts and the sonic receiving and transmitting transducers. Other structural supports can also be utilized, depending upon the specific use of the invention.

FIG. 5 is a block diagram illustrating an electronic system suitable for utilizing the output from two sonic receiving transducers of the type illustrated in FIG. 2 wherein the struts are in the form of displaced sine waves of the type described above. The electrical outputs from this circuit represent data or information about the relative direction and velocity of movement between the struts and the fluid stream in which they are located.

The electronic system illustrated in FIG. 5 comprises first, second, third and fourth dividers 51, 53, 55 and 57; first and second subtractors 59 and 61; first and second multipliers 63 and 65; an adder 67; an arctan ($\tan^{-1}$) circuit 69; and, a Sin circuit 71.

The first and second dividers are period counters. The first divider 51 receives a signal having a modulation frequency $f_a$ from the first receiving transducer and the second divider 53 receives a signal having a modulation frequency $f_b$ from the second receiving transducer. The output from the first divider is a time period signal $t_a$ related to the frequency of modulation created by the vortices in the wake of the first strut by the ratio $t_a = 1/f_a$ and the signal from the second divider is a time period signal $t_b$ related to the frequency of modulation created by the vortices in the wake of the second strut by the ratio $t_b = 1/f_b$. The output from the first divider 51 is applied to the plus (+) input of the first subtractor 59 and the output from the second divider 53 as applied to the plus (+) input of the second subtractor 61.

The second multiplier 65 receives the signal having a modulation frequency $f_a$. The second multiplier 65 also receives a signal designated $d/S + (A/S)$ (Sin $\theta$) and generated in the manner hereinafter described. Thus, in accordance with equation (7) above (rearranged) the second multiplier 65 generates an output signal related to velocity (V). This signal is applied to one output terminal designated 73. The velocity signal is also applied to the third divider 55 which receives at its second input a signal representing $d/S$. Thus, the output from the third divider 55 is a signal representing $d/VS$. This signal is applied to the negative inputs of the first and second subtractors 59 and 61. Thus, the output from the first subtractor is a signal representing $t_a - d/SV$ and the output from the second subtractor is a signal representing $t_b - d/SV$. These two signals are applied to the two inputs of the third divider 57. The third divider in accordance with equations (11) and (12) above (combined) divides these two signals and generates an output signal representing $f_b'/f_a'$. This signal is applied to the arctan circuit 69 and, thus, in accordance with equation (14), a signal representing $\theta$ is developed. The signal representing $\theta$ is applied to a second output terminal 75 and to the Sin circuit 71. The output signal from the Sin circuit 71 represents Sin $\theta$. The Sin $\theta$ signal is applied to one input of the first multiplier 63. The first multiplier 63 also receives a signal representing $A/S$. Thus, the output from the first multiplier is a signal representing $(A/S)$ Sin $\theta$. This signal is applied to the adder 67. The adder also receives a signal designated $d/S$. These two signals are added together to form a resultant signal representing $d/S + (A/S)$ (Sin $\theta$). This signal is applied to the second input of the second multiplier 65, as discussed above.

It will be appreciated from the foregoing description of FIG. 5 that the electronic system therein illustrated, and described above, operates in a manner to perform the mathematical functions described above under equations (7) through (14). Thus, the resultant information at terminals 73 and 75 relates to both the relative velocity and relative direction of movement of the struts with respect to the fluid stream in which they are located.

FIG. 6 is a pictorial diagram that illustrates an alternate embodiment of the invention. FIG. 6 illustrates a base plate 81 having a support rod 83 projecting vertically upwardly therefrom. The support rod 83 supports a first tube 85 and the first tube 85 supports an intermediate support rod 87. The intermediate support rod supports a second tube 89 orthogonally arrayed with respect to the first tube 85.

As illustrated in FIGS. 7 and 8, each end of each of the two tubes includes a straight vortex strut 91 located near the ends of the tubes. Located inwardly from each straight vortex strut 91, on one side of the tube, is a sonic transmitting transducer 93. Located on the other side of each end of each tube from the sonic transmitting transducer 93 is a sonic receiving transducer 95. The transmitting transducers are located such that the "line of sight" between the transducers is at right angles to the longitudinal axis of the straight vortex struts 91. Thus, when relative motion occurs between the vortex struts and the fluid stream in which the structure illustrated in FIG. 6 is mounted, vortices are created inwardly from one end of each of the tubes. These vorticies pass between their associated transmitting and receiving transducers. These transducers, in accordance with the principles set forth in U.S. Pat. application Ser. No. 857,328, referred to above, provide information relating to the velocity of the relative motion. This relative velocity information, becuase it comes from at least two receiving transducers (except for the unique situation of one of the tubes being directly in line with the direction of relative movement), provides information sufficient, through conventional triangulation techniques, to determine the direction of relative movement between the structure illustrated in FIG. 6 and the fluid stream in which it is located.

FIG. 9 illustrates an example of an electronic system suitable for translating the information obtained from the embodiment of the invention illustrated in FIGS. 6, 7 and 8. The electronic system illustrated in FIG. 9 comprises: two threshold detectors 101 and 103; a ratio counter 105; an arctan circuit 107; a Sin circuit 109; two multiplier circuits 111 and 113; a quadrant detector 115; and, an adder 117.

The signals generated at either ends of the first tube 85, designated $f_1$ and $f_3$, are applied to the two inputs of the first threshold detector 101, Similarly the signals generated at either end of the second tube 89, designated $f_2$ and $f_4$, are applied to the two inputs of the second theshold detector 103. Each threshold detector determines which of its two inputs is the highest and applies that input to one input of the ratio counter. Obviously, the "highest" frequency signal determines which end of the tube is receiving a relative velocity input. The "lowest" frequency, if one exists at all, is merely an error signal.

The output from the first threshold detector is designated $f_a$ and the output from the second threshold detector is designated $f_b$. Thus, the output of the ratio counter is $f_a/f_b$ which is designated Tan $\theta_1$. This signal is applied to the input of the arctan circuit. Thus, the arctan circuit generates a signal designated $\theta_1$. $\theta_1$ is applied to one input of the first multiplier 111. The first multiplier also receives the $f_b$ signal. Thus, the output of the first multiplier is $f_b$ Sin $\theta_1$. This signal is multiplied by a constant representing $d/S$ in the second multiplier resulting in a signal related to velocity (V).

The threshold detectors also generate signals related to the quadrant in which relative direction is occurring. These signals are applied to the quadrant detector 115. The quadrant detector determines whether 90°, 180° or 270° should be added to $\theta_1$ in the adder 117 to provide a signal ($\theta$) related to relative direction. Thus, both relative velocity (V) and relative direction ($\theta$) are determined by the system illustrated in FIG. 9.

While only two orthogonally related tubes are illustrated in FIG. 6, it will be appreciated by those skilled in the art and others that an additional number of similar tubes can be included, if desirable. If, for example, three tubes, one located one above the other are used, they are mounted at 60° intervals of separation, rather than 90° as illustrated in FIG. 6. Suitable electronics can be provided for interpreting the signals generated by the transducers in three such tubes to provide directional, as well as velocity information.

It will be appreciated from the foregoing description of preferred embodiments of the invention, that a method of and an apparatus for determining both the relative direction and velocity of movement between a body and a fluid stream is provided. The method and apparatus utilizes sonic means for measuring vortex phenomena in a unique manner that not only provides relative velocity information but also provides relative direction information. Thus, the overall apparatus of the invention is mechanically uncomplicated because it does not include any mechanically moving parts. Yet, the device is accurate over a 360° range of direction. Further, because the device uses sonic techniques for determining the relative velocity and direction information, it is suitable for use in both liquid and gaseous fluids regardless of whether the apparatus of the invention is moving, the fluid is moving or both are moving.

While preferred embodiments of the invention have been illustrated and described, it will be appreciated by those skilled in the art and other that various changes can be made therein without departing from the spirit and scope of the invention. For, example, structural arrangements other than that illustrated in FIG. 2 can be utilized to support the ring-shaped struts and transducers. Further, as alluded to above, more than two orthogonally arrayed tubes can be utilized in the "tube" embodiment of the invention to provide the desired information. Hence, the invention can be practiced otherwise than as specifically described herein.

The embodiments of the invention in which an exclusive property or privilege is claimed are defined as follows:

1. A method of determining the relative direction of movement between a body and a fluid stream in which said body is located comprising the steps of:
    locating a first sonic vortex sensing arrangement affixed to said body in said fluid stream to obtain a first frequency-modulated signal whose frequency of modulation is related to the relative velocity of movement between said body and said fluid stream, said first sonic vortex sensing arrangement using sonic vortex sensing principles wherein a sonic signal is transmitted toward vortices created in the wake of a strut so that said vortices frequency-modulate said transmitted sonic signal to create said first frequency-modulated signal;
    locating a second sonic vortex sensing arrangement also affixed to said body in said fluid stream to obtain a second frequency-modulated signal whose frequency of modulation is related to the relative velocity and direction of movement between said body and said fluid stream, said second vortex sensing arrangement using sonic vortex sensing principles wherein a sonic signal is transmitted toward vortices created in the wake of the strut so that said vortices frequency-modulate said transmitted sonic signal to create said second frequency-modulated signal; and
    combining said first and second frequency-modulated signals in accordance with a predetermined mathematical relationship to obtain a resultant signal related to the direction of movement between said body and said fluid stream.

2. A method of determining the relative direction of movement between a body and a fluid stream in which said body is located as claimed in claim 1 wherein the frequency of said first frequency-modulated signal differs from the frequency of said second freuqency-modulated signal.

3. A method of determining the relative direction of movement between a body and a fluid stream in which said body is located as claimed in claim 2 wherein:

the step of locating said first sonic vortex sensing arrangement in said fluid stream comprises the substeps of:

mounting a first ring-shaped strut in said fluid stream;

mounting a first sonic transmitting transducer so as to direct a first sonic wave generally toward the center of said first ring-shaped strut in a manner such that said first sonic wave is frequency-modulated by vortices flowing toward the center of said first ring-shaped strut, said vortices being created by the relative velocity of movement between said body and said fluid stream;

mounting a first sonic receiving transducer in a position such that it detects said first frequency-modulated sonic wave; and, the step of locating said second sonic vortex sensing arrangement in said fluid stream comprises the substeps of:

mounting a second ring-shaped strut in said fluid stream, the plane defined by said second ring-shaped strut being generally parallel to the plane defined by said first ring-shaped strut;

mounting a second sonic transmitting transducer so as to direct a second sonic wave generally toward the center of said second ring-shaped strut in a manner such that said second sonic wave is frequency-modulated by vortices flowing toward the center of said second ring-shaped strut, said vortices being created by the relative velocity of movement between said body and said fluid stream; and, mounting a second sonic receiving transducer in a position such that it detects said second frequency-modulated sonic wave.

4. A method of determining the relative direction of movement between a body and a fluid stream in which said body is located as claimed in claim 3 wherein said first ring-shaped strut has a constant thickness and wherein said second ring-shaped strut has a thickness that varies in a predetermined manner.

5. A method of determining the relative direction of movement bewtween a body and a fluid stream in which said body is located as claimed in claim 4 wherein the thickness of both said first and said second ring-shaped struts vary in a predetermined manner.

6. A method of determining the relative direction of movement between a body and a fluid stream in which said body is located as claimed in claim 5 wherein said predetermined manner is in the form of a sine wave, said first and second struts being displaced 90° with respect to one another in their respective planes.

7. A method of determining the relative direction of movement between a body and a fluid stream in which said body is located as claimed in claim 1 wherein:

the step of locating said first sonic vortex sensing arrangement in said fluid stream comprises the substep of mounting a first tube including a sonic vortex sensing device at either end thereof in said fluid stream, each of said sonic vortex sensing devices including a vortex strut located adjacent the associated end of said first tube and a sonic transmitting-receiving transducer arrangement located inwardly in said first tube from said vortex strut; and, the step of locating said second sonic vortex sensing arrangement in said fluid stream comprises the substep of mounting a second tube including a sonic vortex sensing device at either end thereof in said fluid stream orthogonally with respect to said first tube, each of said sonic vortex sensing devices including a vortex strut located adjacent the associated end of said second tube and a sonic transmitting-receiving transducer arrangement located inwardly in said second tube from said vortex strut.

8. A method of determining the relative velocity and direction of movement between a body and a fluid stream in which said body is located comprising the steps of:

locating a first sonic vortex sensing arrangement affixed to said body in said fluid stream to obtain a first frequency-modulated signal whose frequency of modulation is related to the relative velocity of movement between said body and said fluid stream, said first sonic vortex sensing arrangement using sonic vortex sensing principles wherein a sonic signal is transmitted toward vortices created in the wake of a strut so that said vortices frequency-modulate said transmitted sonic signal to create said first frequency-modulated signal;

locating a second sonic vortex sensing arrangement also affixed to said body in said fluid stream to obtain a second frequency-modulated signal whose frequency of modulation is related to the relative velocity and direction of movement between said body and said fluid stream, said second vortex sensing arrangement using sonic vortex sensing principles wherein a sonic signal is transmitted toward vortices created in the wake of the strut so that said vortices frequency-modulate said transmitted sonic signal to create said second frequency-modulated signal; and, combining said first and second frequency-modulated signals in accordance with a predetermined mathematical relationship to obtain resultant signals related to the velocity and direction of movement between said body and said fluid stream.

9. A method of determining the relative velocity and direction of movement between a body and a fluid stream in which said body is located as claimed in claim 8 wherein the frequency of said first frequency-modulated signal differs from the frequency of said second frequency-modulated signal.

10. A method of determining the relative velocity and direction of movement between a body and a fluid stream in which said body is located as claimed in claim 9 wherein;

the step of locating said first sonic vortex sensing arrangement in said fluid stream comprises the substeps of mounting a first ring-shaped strut in said fluid stream;

mounting a first sonic transmitting transducer so as to direct a first sonic wave generally toward the center of said first ring-shaped strut in a manner such that said first sonic wave is frequency-modulated by vortices flowing toward the center of said first ring-shaped strut, said vortices being created by the relative velocity of movement between said body and said fluid stream; and mounting a first sonic receiving transducer in a position such that it detects said first frequency-modulated sonic wave; and, the step of locating said second sonic vortex sensing arrangement in said fluid stream comprises the substeps of:

mounting a second ring-shaped strut in said fluid stream, the plane defined by said second ring-hsaped strut being generally parallel to the plane defined by said first ring-shaped strut;

mounting a second sonic transmitting transducer so as to direct a second sonic wave generally toward the center of said second ring-shaped strut in a manner such that said second sonic wave is frequency-modulated by vortices flowing toward the center of said second ring-shaped strut, said vortices being created by the relative velocity of movement between said body and said fluid stream; and, mounting a second sonic receiving transducer in a position such that it detects said second frequency-modulated sonic wave.

11. A method of determining the relative velocity and direction of movement between a body and a fluid stream in which said body is located as claimed in claim 10 wherein said first ring-shaped strut has a constant thickness and wherein said second ring-shaped strut has a thickness that varies in a predetermined manner.

12. A method of determining the relative velocity and direction of movement between a body and a fluid stream in which said body is located as claimed in claim 10 wherein the thickness of both said first and said second ring-shaped struts vary in a predetermined manner.

13. A method of determining the relative velocity and direction of movement between a body and a fluid stream in which said body is located as claimed in claim 12 wherein said predetermined manner is in the form of a sine wave, said first and second struts being displaced 90° with respect to one another in their respective planes.

14. A method of determining the relative velocity and direction of movement between a body and a fluid stream in which said body is located as claimed in claim 8 wherein:

the step of locating said first sonic vortex sensing arrangement in said fluid stream comprises the substep of mounting a first tube including a sonic vortex sensing device at either end thereof in said fluid stream, each of said sonic vortex sensing devices including a vortex strut located adjacent the associated end of said first tube and a sonic transmitting-receiving transducer arrangement located inwardly in said first tube from said vortex strut; and, the step of locating said second sonic vortex sensing arrangement in said fluid stream comprises the substep of mounting a second tube including a sonic vortex sensing device at either end thereof in said fluid stream orthogonally with respect to said first tube, each of said sonic vortex sensing devices including a vortex strut located adjacent the associated end of said second tube and a sonic transmitting-receiving transducer arrangement located inwardly in said second tube from said vortex strut.

15. Apparatus for determining the relative direction of movement between a body and a fluid stream in which the body is located comprising:

a first vortex sensing arrangement affixed to said body, said first vortex sensing arrangement including a first ring-shaped strut and a means for sensing the rate of vortex generation created in the wake of said first ring-shaped strut by relative movement between said body and said fluid stream, said first ring-shaped strut defining a plane;

a second vortex sensing arrangement affixed to said body, said second vortex sensing arrangement including a second ring-shaped strut and a means for sensing the rate of vortex generation created in the wake of said second ring-shaped strut by relative movement between said body and said fluid stream, said rate being related to the direction of said relative movement, said second ring-shaped strut lying in a plane parallel to the plane defined by said first ring-shaped strut; and, combining means connected to said first and second vortex sensing arrangements for combining the signals related to the rate of vortex generation so as to determine the relative direction of movement between said body and said fluid stream.

16. Apparatus for determining the relative direction of movement between a body and a fluid stream in which the body is located as claimed in claim 15 wherein said first and second means for sensing the rate of vortex generation are sonic velocity sensing arrangements wherein a sonic signal is modulated by the vortices created in the wake of said first and seocnd ring-shaped struts by relative movement.

17. Apparatus for determining the relative direction of movement between a body and a fluid stream in which the body is located as claimed in claim 16 wherein each of said sonic velocity sensing arrnagements comprises:

a transmitting transducer adapted to transmit a sonic signal generally toward the center of its associated ring-shaped strut; and, a sonic receiving transducer mounted so as to detect the sonic signal transmitted by said transmitting transducer as modulated by vortices created in the wake of said associated ring-shaped strut and flowing toward the center thereof.

18. Apparatus for determining the relative direction of movement between a body and a fluid stream in which the body is located as claimed in claim 17 wherein said first ring-shaped strut has a constant thickness and wherein said second ring-shaped strut has a thickness that varies in a predetermined manner.

19. Apparatus for determining the relative direction of movement between a body and a fluid stream in which the body is located as claimed in claim 18 wherein said second ring-shaped strut has a constant thickness change and includes a discontinuous point.

20. Apparatus for determining the relative direction of movement between a body and a fluid stream in which the body is located as claimed in claim 18 wherein said second ring-shaped ring strut is in the form of a crown.

21. Apparatus for determining the relative direction of movement between a body and a fluid stream in which the body is located as claimed in claim 17 wherein said first and second ring-shaped struts both vary in thickness in a predetermined manner.

22. Apparatus for determining the relative direction between a body and a fluid stream in which the body is located as claimed in claim 21 wherein said first and second ring-shaped struts vary in thickness in a sinusoidal manner and are displaced from one another.

23. Apparatus for determining the relative velocity and direction of movement between a body and a fluid stream in which the body is located comprising:
  a first vortex sensing arrangement affixed to said body, said first vortex sensing arrangement including a first ring-shaped strut and a means for sensing the rate of vortex generation created in the wake of said first ring-shaped strut by relative movement between said body and said fluid stream, said first ring-shaped strut defining a plane;
  a second vortex sensing arrangement affixed to said body, said vortex sensing arrangement including a second ring-shaped strut and a means for sensing the rate of vortex generation created in the wake of said second ring-shaped strut by relative movement between said body and said fluid stream, said rate being related to the direction of said relative movement, said second ring-shaped strut lying in a plane generally parallel to the plane defined by said first ring shaped strut; and,
  combining means connected to said first and second vortex sensing arrangements for combining the signals related to the rate of vortex generation so as to determine the relative velocity and direction of movement between said body and said fluid stream.

24. Apparatus for determining the relative velocity and direction of movement between a body and a fluid stream in which the body is located as claimed in claim 23 wherein said first and second means for sensing the rate of vortex generation are sonic velocity sensing arrangements wherein a sonic signal is modulated by the vortices created in the wake of said first and second ring-shaped struts by relative movement.

25. Apparatus for determining the relative velocity and direction of movement between a body and a fluid stream in which the body is located as claimed in claim 24 wherein each of said sonic velocity sensing arrangement comprises:
  a transmitting transducer adapted to transmit a sonic signal generally toward the center of its associated ring-shaped strut; and,
  a sonic receiving transducer mounted so as to detect the sonic signal transmitted by said transmitting transducer as modulated by vortices created in the wake of said associated ring-shaped strut and flowing toward the center thereof.

26. Apparatus for determining the relative velocity and direction of movement between a body and a fluid stream in which the body is located as claimed in claim 25 wherein said first ring-shaped strut has a constant thickness and wherein said second ring-shaped strut has a thickness that varies in a predetermined manner.

27. Apparatus for determining the relative velocity and direction of movement between a body and a fluid stream in which the body is located as claimed in claim 26 wherein said second ring-shaped strut has a constant thickness change and includes a discontinuous point.

28. Apparatus for determining the relative velocity and direction of movement between a body and a fluid stream in which the body is located as claimed in claim 26 wherein said second ring-shaped ring strut is in the form of a crown.

29. Apparatus for determining the relative velocity and direction of movement between a body and a fluid stream in which the body is located as claimed in claim 25 wherein said first and second ring-shaped struts both vary in thickness in a predetermined manner.

30. Apparatus for determining the relative velocity and direction of movement between a body and a fluid stream in which the body is located as claimed in claim 29 wherein said first and second ring-shaped struts vary in thickness in a sinusoidal manner and are displaced from one another by 90° in their respective planes.

31. Apparatus for determining the relative direction of movement between a body and fluid stream in which the body is located comprising:
  a first vortex sensing arrangement affixed to said body, said first vortex sensing arrangement comprising:
    a first tube;
    first and second vortex struts, one located at either end of said first tube; and,
    first and second transmitter-receiver sonic transducer arrangements located in said first tube inwardly of said first and second vortex struts, the first transmitter-receiver sonic transducer arrangement being associated with said first vortex strut and the second transmitter-receiver sonic transducer arrangement being associated with said second vortex strut, the transmitter portions of said sonic transducer arrangements adapted to transmit sonic signals which are modulated by vortices created in the wake of their associated struts by relative movement between said body and said fluid stream, the receiver portions of said sonic transducer arrangements adapted to sense said modulated signal;
  a second vortex sensing arrangement affixed to said body, said second vortex sensing arrangement comprising:
    a second tube;
    third and fourth vortex struts, one located at either end of said second tube; and,
    third and fourth transmitter-receiver sonic transducer arrangements located in said first tube inwardly of said third and fourth vortex struts, the third transmitter-receiver sonic transducer arrangement being associated with said third vortex strut and the fourth transmitter-receiver sonic transducer arrangement being associated with said fourth vortex strut, the transmitter portions of said sonic transducer arrangements adapted to transmit sonic signals which are modulated by vortices created in the wake of their associated struts by relative movement between said body and said fluid stream, the receiver portions of said sonic transducer arrangements adapted to sense said modulated signal;
  combining means connected to said first and second vortex sensing arrangements for combining the signal sensed by said receiver portions in accordance with a mathematical relationship so as to generate a signal related to the relative direction of movement between said body and said fluid stream.

32. Apparatus for determining the relative velocity and direction of movement between a body and fluid stream in which the body is located comprising:

a first vortex sensing arrangement affixed to said body, said first vortex sensing arrangement comprising:

a first tube;

first and second vortex struts, one located at either end of said first tube; and, first and second transmitter-receiver sonic transducer arrangements located in said first tube inwardly of said first and second vortex struts, the first transmitter-receiver sonic transducer arrangement being associated with said first vortex strut and the second transmitter-receiver sonic transducer arrangement being associated with said second vortex strut, the transmitter portions of said sonic transducer arrangements adapted to transmit sonic signals which are modulated by vortices created in the wake of their associated struts by relative movement between said body and said fluid stream, the receiver portions of said sonic transducer arrangements adapted to sense said modulated signal;

a second vortex sensing arrangement affixed to said body, said second vortex sensing arrangement comprising:

a second tube;

third and fourth vortex struts, one located at either end of said second tube; and, third and fourth transmitter-receiver sonic transducer arrangements located in said first tube inwardly of said third and fourth vortex struts, the third transmitter-receiver sonic transducer arrangement being associated with said third vortex strut and the fourth transmitter-receiver sonic transducer arrangement being associated with said fourth vortex strut, the transmitter portions of said sonic transducer arrangements adapted to transmit sonic signals which are modulated by vortices created in the wake of their associated struts by relative movement between said body and said fluid stream, the receiver portion of said sonic transducer arrangements adapted to sense said modulated signal;

combining means connected to said first and second vortex sensing arrangements for combining the signal sensed by said receiver portions in accordance with a mathematical relationship so as to generate signals related to the relative velocity and direction of movement between said body and said fluid stream.

* * * * *